United States Patent
Snaman, Jr. et al.

(10) Patent No.: US 9,235,352 B2
(45) Date of Patent: Jan. 12, 2016

(54) DATASTORE FOR NON-OVERWRITING STORAGE DEVICES

(71) Applicant: DELL PRODUCTS L.P., Round Rock, TX (US)

(72) Inventors: William Edward Snaman, Jr., Nashua, NH (US); Damon Hsu-Hung, Providence, RI (US)

(73) Assignee: Dell Products L.P., Round Rock, TX (US)

( * ) Notice: Subject to any disclaimer, the term of this patent is extended or adjusted under 35 U.S.C. 154(b) by 387 days.

(21) Appl. No.: 13/683,905

(22) Filed: Nov. 21, 2012

(65) Prior Publication Data

US 2014/0143488 A1    May 22, 2014

(51) Int. Cl.
G06F 12/00     (2006.01)
G06F 3/06      (2006.01)

(52) U.S. Cl.
CPC ............ *G06F 3/0644* (2013.01); *G06F 3/0607* (2013.01); *G06F 3/0679* (2013.01)

(58) Field of Classification Search
USPC ............................................ 360/75; 711/114
See application file for complete search history.

(56) References Cited

U.S. PATENT DOCUMENTS

| | | | | |
|---|---|---|---|---|
| 5,526,519 | A * | 6/1996 | Maruyama et al. | 1/1 |
| 6,038,636 | A * | 3/2000 | Brown et al. | 711/103 |
| 6,170,066 | B1 * | 1/2001 | See | 714/22 |
| 7,373,364 | B1 * | 5/2008 | Chapman | 1/1 |
| 2007/0247738 | A1 * | 10/2007 | Yamagishi | 360/75 |
| 2009/0198946 | A1 * | 8/2009 | Ebata | 711/171 |

OTHER PUBLICATIONS

Gibson, Garth, "Principles of Operation for Shingled Disk Devices," PDL Packet, Newsletter on PDL Activities and Events, Spring 2011, http://www.pdlcmu.edu/, pp. 17-19.

* cited by examiner

*Primary Examiner* — Mardochee Chery
(74) *Attorney, Agent, or Firm* — Hamilton, Brook, Smith & Reynolds, P.C.

(57) ABSTRACT

The invention pertains to a method and information handling system (IHS) for writing data to non-overwriting storage devices. A set of bands are determined per non-overwriting storage device. Then multiple pools of storage space, to which data can be written, commensurate with the determined bands are provided. A file system configured to manage the determined multiple pools of storage space and be non-WIP is provided, where the provided file system writes data to the multiple pools of storage space. The IHS includes: a non-overwriting storage device, a module for determining a set of bands per non-overwriting storage device, multiple pools of storage space commensurate with the determined set of bands and a file system configured to be non-WIP and configured to manage the multiple pools of storage space. The file system writes data to the multiple pools of storage space.

24 Claims, 5 Drawing Sheets

DATASTORE FOR NON-OVERWRITING STORAGE DEVICES

BACKGROUND OF THE INVENTION

A disk drive is a device implementing disk storage in which data is digitally recorded by various electronic magnetic optical or mechanical methods on disks (also referred to as the media). Disk storage is used in both computer storage and consumer electronic storage (e.g., audio CDs and video disks, standard DVD and Blu-Ray). To that end, disk drives may implement such disk storage with fixed or removable media. With removable media, the device is usually distinguished from the media as in a compact disk drive and a compact disk. Notable types of disk drives are the hard disk drive (HDD) containing a nonremovable disk, the floppy disk drive (FDD) and its removable floppy disk, and various optical disk drives and associated optical disk media.

A hard disk drive stores data onto tracks, heads, and sectors of a disk. A sector is a segment of a track, and the track is a circle of recorded data on a single recording surface or platter (an individual recording disk). The sector unit is the smallest size of data to be stored in a hard disk drive and each data file may have many sector units assigned to it. Digital disk drives are block storage devices. Each disk is divided into logical blocks (which may be larger or smaller than a physical sector). Blocks are addressed using their logical block addresses (LBA). Reading from or writing to a disk happens at the granularity of blocks.

The disk drive interface is the mechanism/protocol of communication between the rest of the system and the disk drive itself. Storage devices intended for desktop and mobile computers typically use ATA (Advanced Technology Attachment), PATA (Parallel ATA), and SATA (Serial ATA) interfaces. Enterprise systems and other storage devices typically use SCSI (Small Computer System Interface), SAS (serial-attached SCSI), and FC (Fibre Channel) interfaces in addition to some use of SATA.

Computer users are requiring an ever-increasing amount of disk drive storage space. Home computer users' increased storage of multimedia data, especially video and photographic data, has only served to increase the amount of storage space needed. Likewise, industry also requires increased storage space. As more and more business is being conducted electronically, there has been an ever-increasing demand and need for the storage of this vast amount of business data. Furthermore, there has been a demand to digitize the storage of once paper files in an attempt to decrease the overhead cost of this paper generation and storage.

Currently, the majority of this electronic data is stored on magnetic hard disk drive devices. However, the increased need of storage capacity has made current magnetic disk storage devices inadequate and a solution to this problem is necessary.

"Shingled Magnetic Recording," (SMR) is a method of increasing the storage density of current magnetic hard disk drives. However, utilizing SMR devices requires a fundamentally new and different access model that allows random reads and only sequential writes.

A SMR device is divided into a configurable number of regions, called bands. The bands comprise tracks like standard magnetic recording devices and likewise these tracks comprise sectors. Unlike standard magnetic recording devices, the tracks on a SMR device are overlapped, also known as, shingled, thus increasing the storage density of the device. The bands of a SMR device may be configurable. This allows certain bands to be configured for "sequential access" while other bands on the same platter can be "random access" like traditional magnetic storage devices. A "sequential access band" supports random reads, but may only be written to sequentially. More precisely, data must be written starting at the beginning of the band, and may be added only in sequential order. Typically, any data already written in a sequential band cannot be changed, except by erasing the entire band and starting over at the beginning (for writing). A "random access band" supports random writes as well as reads, similar to existing hard disk drives, and does not possess the improved density of SMR sequential access bands.

SMR disk drives are being promoted as a means to increase the storage density of magnetic disk drives using current-generation technology. However, existing systems have no ability to cope with the different access model that SMR technology requires. Manufacturers plan to implement emulation strategies to make a SMR device behave like a traditional random-access device. However, some manufacturers have been amenable to providing a separate interface that exposes the native layout of the SMR device, along with its attendant limitations.

More information can be found here:
www.pdl.cmu.edu/ftp/News/newsletter11.pdf

SUMMARY OF THE INVENTION

Thus a method of writing data that can utilize SMR devices is needed. Embodiments of the present invention provide a method whereby a file system may support the necessary SMR access model.

An SMR device can be classified as a "non-overwriting storage device" and as such the disclosed embodiments are not limited to writing data to only SMR devices. Writing data to SMR devices can be advantageous; however, the disclosed embodiments could be used to write data to other non-overwriting type storage devices.

The present invention is directed to a method and apparatus for writing data to a non-overwriting storage device. The method begins by determining a set of bands on each non-overwriting storage device on which data is to be written. Next, multiple pools of storage space commensurate with the determined bands are provided. Finally, a file system configured to be non-write-in-place (non-WIP) and configured to manage the multiple pools of storage space is provided. This provided file system writes data to the multiple pools of storage space that were provided. The non-WIP characteristic of the file system is a feature whereby the file system may not write data directly over existing data, but instead may write data to a new location.

In another embodiment of the invention, an information handling system (IHS) for writing data to a non-overwriting storage device is disclosed. The IHS comprises a non-overwriting storage device such as a SMR device, a module for determining a set of bands per non-overwriting storage device, multiple pools of storage space commensurate with the determined set of bands and a file system configured to, be non-WIP and manage the multiple pools of storage space, wherein the provided file system writes data to the multiple pools of storage space.

The non-overwriting storage device may be an array of such devices. An embodiment of the present invention may also write data to a non-overwriting storage device with configurable bands. The provided file system in the present invention may be a modified version of any number of file systems, such as LFS (BSD-LFS), ZFS, WAFL, BTRfs, UDF, Hammer, Fossil, NILFS, ULFS, CASL, SISL, JFFS/JFFS2, UBIFS, LogFS, YAFFS, or F2FS. Furthermore, the provided file system may be configured to maintain a separate write pointer for each band on the non-overwriting storage device, the separate write pointer signifying a position on the non-overwriting storage device where data can be written. The file system may be configured to write data sequentially to the non-overwriting storage device. The non-overwriting storage device may be a SMR device in its native configuration or an array of SMR devices each in a native configuration where the file system is configured to write data sequentially. Additionally, in an embodiment of the present invention an invalidated space in a pool of storage space cannot be reclaimed until the entire pool of storage space is reclaimed. The file system may be configured to automatically reclaim the multiple pools of storage space, and/or reclaim the multiple pools of storage space in response to a demand.

Embodiments of the present invention address the shortcomings of the prior art. When writing data to SMR devices embodiments reap the benefit of increased storage efficiency.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
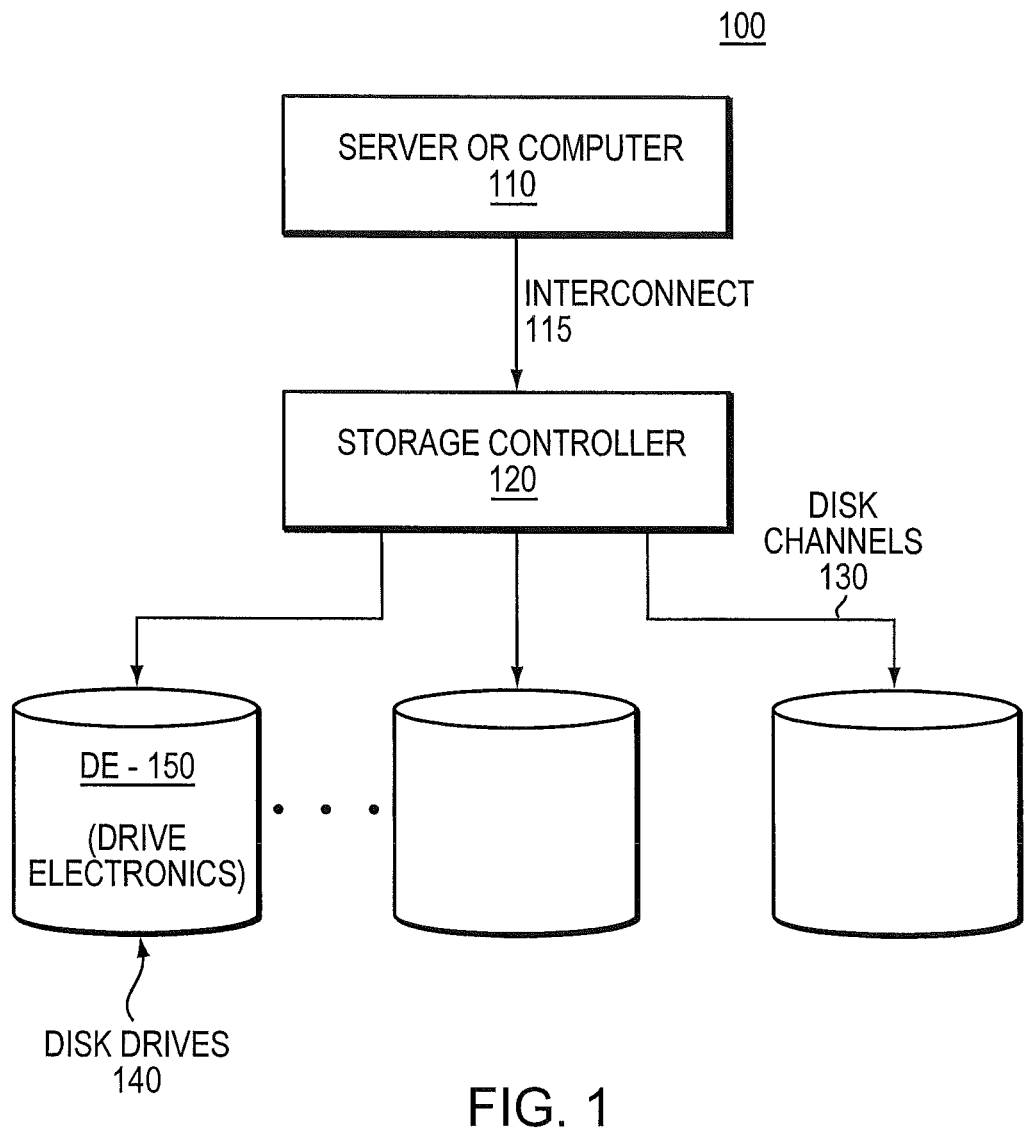
FIG. 1 is a schematic view of a computer system with disk storage in which the present invention may be implemented.

FIG. 1 shows a computer system 100, which may be a server system or a user workstation such as a desktop or laptop computer. The host or base computer 110 (the central processor of the computer system excluding its attached storage), connects to a storage controller 120. The storage controller 120 may be a simple disk controller, or it may incorporate more advanced storage mechanisms such as Redundant Array of Independent Disks (RAID). The computer 110 is connected to the controller 120 via an interconnect 115. The interconnect 115 may be a system bus such as the Peripheral Component Interface (PCI) bus, or it may be a Storage Area Network (SAN) based on Fibre Channel or other SAN technology. The storage controller 120 in turns connects to one or more disk drives 140, via disk channels 130. The disk channels 130 may be provided by any suitable disk drive interface such as Advanced Technology Attachment (ATA), Small Computer System Interface (SCSI) or other disk interfaces.

Disk drives 140 have respective drive electronics 150. The processes described below (e.g. method 300 of FIG. 3) may be implemented in computer 110, storage controller 120 and/or within drive electronics 150.

Figure 2A:
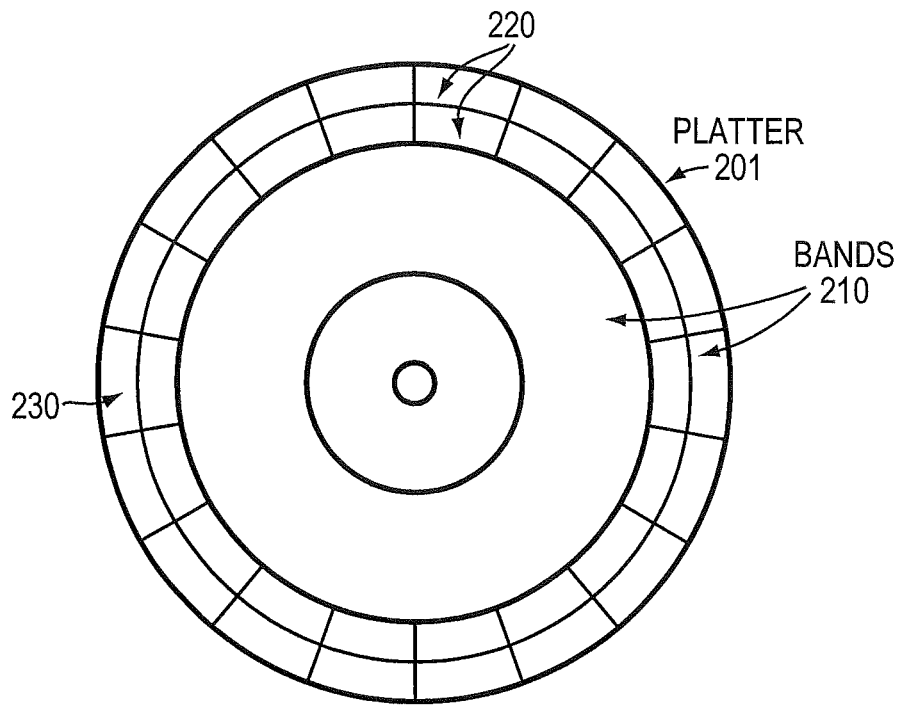
FIG. 2a is a depiction of a platter of a non-overwriting storage device to which embodiments of the invention may write data.

FIG. 2a illustrates a single platter 201 of a storage device 140 using unshingled tracks 220. The platter 201 is divided into bands 210. The bands 210 represent independent regions of storage space to which data can be written. The bands 210 may be configurable. For example, some bands 210 on the platter 201 could be configured to allow for random access writes while other bands 210 on the platter 201 are configured for sequential access writes. The bands 210 are composed of a grouping of unshingled tracks 220. The unshingled tracks 220 are composed of sectors 230 to which data can be written.

Figure 2B:
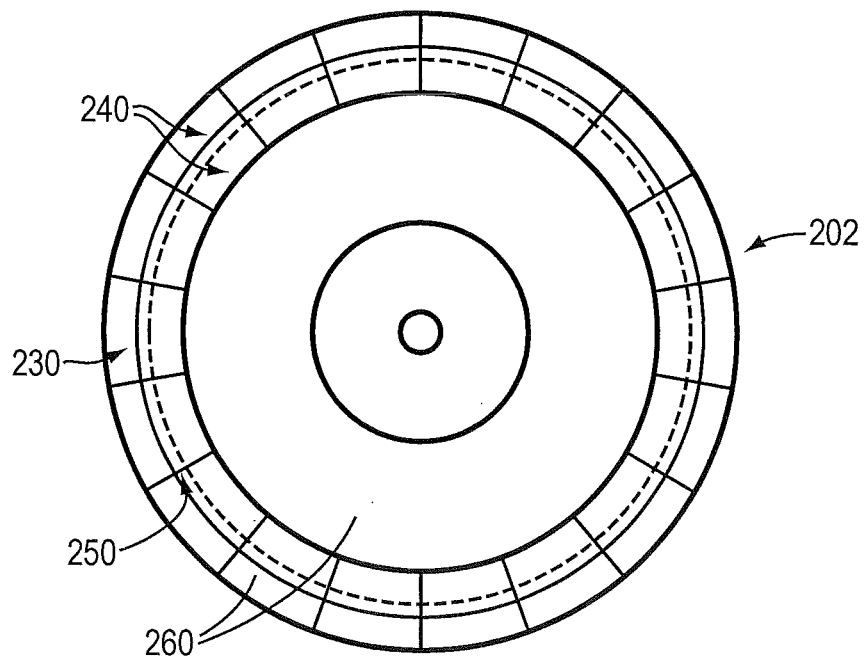
FIG. 2b is a depiction of a platter of a SMR device to which embodiments may write data.

FIG. 2b illustrates a single platter 202 of a storage device 140, to which the current invention could write data. The platter 202 is divided into bands 260. The bands 260 represent independent regions of data storage space. These bands 260 may be representative of the sequential access bands of a SMR device. A single storage device 140 or any array of such devices 140 may have bands of many different sizes. The bands 260 are composed of a grouping of shingled tracks 240. The shingled tracks 240 overlap some amount 250. This overlap 250 allows for the increased storage density of the platter 202 and the underlying device 140. The shingled tracks 240 are composed sectors 230 to which data can be written.

Figure 3:
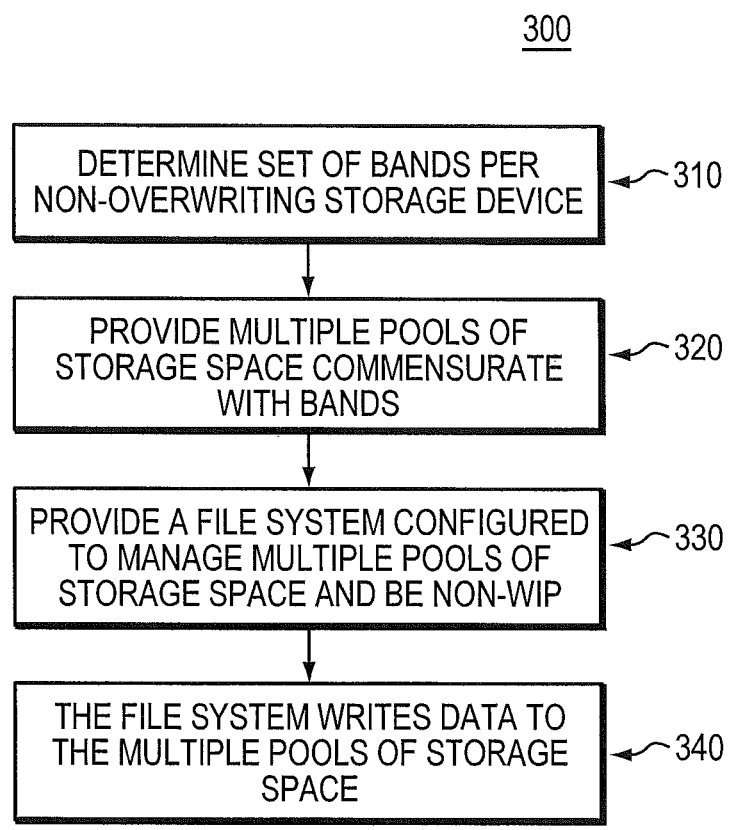
FIG. 3 is a flow chart of the method of storing data on a non-overwriting storage device according to the principles of the present invention.

FIG. 3 is flow diagram of a method 300 of writing data to a non-overwriting storage device, such as disk drive 140. First, a set of bands per non-overwriting storage device are determined, 310. The determined bands 310 could be on platter 201 or 202. Likewise, the determined bands could be composed of unshingled tracks 220 or shingled tracks 240. After determining a set of bands 310, multiple pools of storage space commensurate with the determined set of bands are provided, 320. The provided multiple pools of storage space 320 could comprise unshingled tracks 220, or shingled tracks 240. Next, a file system is provided, 330. The provided file system 330, is configured to be non-WIP and manage the determined multiple pools of storage space. Finally, the provided file system 330 writes data to the previously provided multiple pools of storage space at step 340.

The method 300 may be implemented in computer 110, in storage controller 120, or within drive electronics 150 contained in the disk drives 140. When implemented in computer 110, typically the implementation would be part of the operating system or device drivers installed in that computer.

In addition the method 300 might be implemented in part in one component and in part in another. For example, one part of the processes might be implemented in disk drives 140, while another part is implemented in storage controller 120.

The method 300 at step 340 writes data to a non-overwriting storage device, such as a SMR device configured with emulation software. In an embodiment of method 300 the non-overwriting storage device is an array of such devices. The devices in the array could be in a RAID configuration. In another embodiment of method 300 the non-overwriting storage device is a SMR device in its native configuration, i.e., a SMR device that is not utilizing emulation software. Writing data to a SMR device has the advantage of writing data to a device with increased storage density, as this is a property of the underlying device. Again, the non-overwriting storage device is not limited to a single drive and in yet another embodiment of method 300 data is written to an array of SMR devices configured with emulation software. In yet another embodiment of the present invention the non-overwriting storage device is an array of SMR devices each in a native configuration. This array of SMR drives could be in a RAID configuration. Writing data to an array of non-overwriting drives in a RAID configuration such as RAID5, amongst other things provides the added advantage of data redundancy and recovery.

The method 300 can be performed by providing any number of different file systems at 330. The provided file system should be configured to manage the multiple pools of storage space, e.g., write data to and delete data from the non-overwriting storage device. Additionally, the provided file system should be configured to be non-WIP. No particular file system must be used and a person of ordinary skill in art would understand numerous different file systems may be provided. The provided file system may be a modified version of a pre-existing file system. For example, the Vulcan Object Store file system could be used. The Vulcan Object Store file system possesses the property that data is never overwritten "in place," e.g., it is non-WIP. To be used in method 300, this file system may be modified to manage the determined multiple pools of storage space. Unlike the file system provided in method 300, most traditional file systems when changing (or overwriting) a piece of data essentially erase the old data and put the new data in its place. This traditional method is known as "write-in-place." Many modern file systems do not do this; instead, they put new data in a new location, along with recordkeeping data, metadata, which indicates that the old data is no longer valid. Writing new data in a new location and updating metadata indicating that the old data is no longer valid is the hallmark of non-WIP. In addition to the Vulcan Object Store file system, other file systems that may be modified to be used in method 300 include LFS (BSD-LFS), ZFS, WAFL, BTRfs, UDF, Hammer, Fossil, NILFS, ULFS, CASL, SISL, JFFS/JFFS2, UBIFS, LogFS, YAFFS, or F2FS The method 300 and its different embodiments have many advantages over the prior art. However, the method is further optimized in other embodiments of the invention. In one such embodiment, the provided file system 330, maintains a separate write pointer for each independent region of storage space. In an embodiment, this would equate to maintaining a separate write pointer for each band on a non-overwriting storage device. These separate write pointers signify the current position at which data may be appended.

In another embodiment, the method 300, always appends data to the current band. The current append location in the current band can be signified by the maintained write pointer. This in turn yields an embodiment where data is written sequentially. Where the provided file system is configured to write data sequentially, the method 300 may write data to a SMR device in its native state or an array of SMR devices each in its native state. This provides for a very efficient method of writing data to a storage device. Traditional magnetic spinning media writes data inefficiently because it is a random write device. This forces the head of the disk drive to jump around to different writing locations. This embodiment of the invention, where data is appended to the current band sequentially, prevents the inefficient movement necessitated by random writes. In another embodiment the provided file system is configured to write data sequentially to the pool of storage space and the method 300 writes data to an array of SMR devices.

Another embodiment of the current invention provides for "garbage collection," i.e. the reclaiming of storage space with invalid or deleted data. While the method 300 writes data to a non-overwriting storage device, old, "deleted" data, is not preserved in perpetuity. As stated above a file system configured to be non-WIP updates metadata when old data is no longer valid. If this old data was maintained in perpetuity drives would quickly become full. Instead, in an embodiment of the invention the provided file system maintains a method of "garbage collection" whereby old space is eventually reclaimed. In method 300, data is written to multiple pools of storage space, the pools of storage space are commensurate with the determined set of bands. When data is deleted from a pool of storage space, the corresponding metadata is updated, and in most scenarios the data will not be overwritten. An embodiment of method 300 will only reclaim this invalidated storage space when the entire corresponding pool of storage space is reclaimed. This ensures that data is still written in an efficient manner and allows the method 300 to more efficiently write data to native state SMR devices. This "garbage collection" can be performed either in the background unbeknownst to the user, or it can be carried out in response to a user demand.

In the current state of SMR device technology the band sizes in SMR devices are still hypothetical. The band size will depend on how closely the tracks within the band can be shingled. That being said the provided file system should have the ability to support writing data to pools of storage space much larger than the typical band size of a single SMR device. As previously stated, the method 300, determines a set of bands per non-overwriting storage device 310. These determined bands are independent regions of storage space to which data may be written. These bands can be representative of the sequential access bands of a SMR device. The provided file-system of method 300 is aware of the bands of the underlying non-overwriting storage device as data is ultimately written to the multiple pools of storage space commensurate with the bands. In an embodiment of method 300, data is written sequentially within a band. This represents the method 300 writing data sequentially to a "independent bucket" of storage space. However, if the underlying device 140 is not a single non-overwriting storage device, but an array of such devices, the file system still needs to maintain sequential writing to the "independent bucket" of storage space. However, now the "independent bucket" of storage space is composed of bands across a multitude of non-overwriting storage devices. Consequently, the provided non-overwriting file system will need to support writing data to "independent buckets" of storage space that are much larger then the typical band size of a single SMR device. For example, consider a hypothetical SMR drive with a 1 terabyte capacity and 1000 sequential access bands of one gigabyte each. The above mentioned "garbage collection" on such a large band (bucket of storage space) may be moderately onerous. However, an array of 10 such SMR devices would present a 10 gigabyte bucket, making "garbage collection" exceptionally onerous. Consequently, the provided non-overwriting file system of method 300 should be able to efficiently support "buckets" of onerous sizes.

Figure 4:
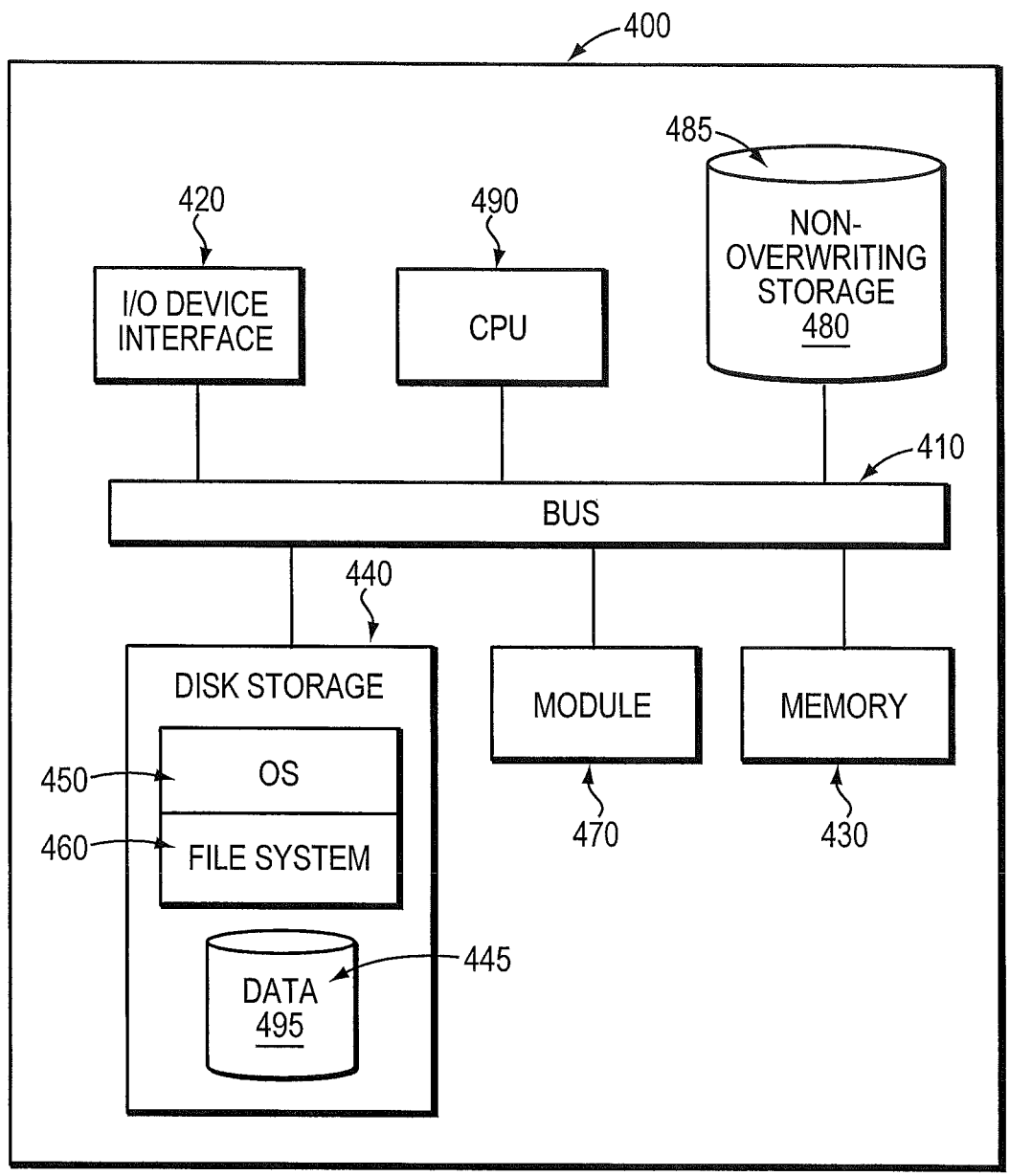
FIG. 4 is a high level block diagram of an information handling system (IHS) of the present invention that writes data on a non-overwriting storage device.

FIG. 4 is a high level block diagram of a information handling system (IHS) 400 that writes data to a non-overwriting storage device 480. The IHS 400 contains a bus 410. The bus 410 is a connection between the various components of the IHS 400. Connected to the bus 410 is an input/output device interface 420 for connecting various input and output devices, such as a keyboard, mouse, display, speakers, etc. to the IHS 400. Central Processing Unit (CPU) 490 is connected to the bus 410 and provides for the execution of computer instructions. Memory 430 provides volatile storage for data used for carrying out computer instructions. Disk storage 440 provides non-volatile storage for software instructions such as the operating system (OS) 450. Coupled with the operating system 450, is the file system 460. Disk storage 440 may also be a non-overwriting storage device to which data 495 is written. In an embodiment, data can be written to non-overwriting storage device 480 connected to bus 410. While two examples of possible non-overwriting storage devices 440 and 480 are shown, IHS 400 could comprise any number of non-overwriting storage devices.

IHS 400 also comprises module 470 connected to bus 410. Module 470 determines the set of bands per non-overwriting storage device 440 and/or 480. While module 470 is shown connected to bus 410, module 470 could also be within storage devices 440 or 480, CPU 490, OS 450, file system 460, or memory 430. Each non-overwriting storage device 440 and/or 480 with its determined bands contains multiple pools of storage space 445 and 485 commensurate with its determined bands. Module 470 supports the file system 460 with writing data to the multiple pools of storage space 445, 485.

Figure 5:
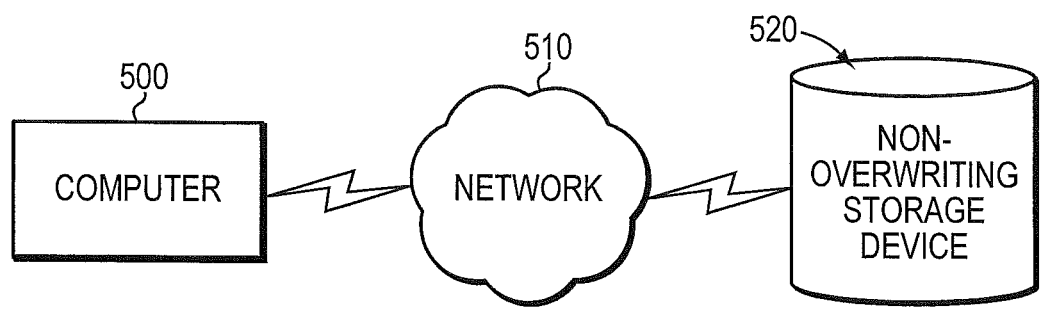
FIG. 5 depicts a computer network in which the present invention may be implemented.

FIG. 5 illustrates a computer network environment in which the present invention may be implemented. Computer 500 can be linked through communications network 510 to non-overwriting storage device 520. Computer 500 could embody IHS 400 or computer system 100.

While this invention has been particularly shown and described with references to example embodiments thereof, it will be understood by those skilled in the art that various changes in form and details may be made therein without departing from the scope of the invention encompassed by the appended claims.

The teachings of all patents, published applications and references cited herein are incorporated by reference in their entirety.

What is claimed is:

1. A method of writing data on a non-overwriting storage device comprising:
    determining a set of bands per non-overwriting storage device;
    providing multiple pools of storage space commensurate with the determined set of bands; and
    providing a file system configured to be non-write-in-place (non-WIP) and manage the multiple pools of storage space, wherein the provided file system writes data to the multiple pools of storage space;
    wherein the provided file system is configured to maintain a separate write pointer for each pool of storage space, wherein the write pointer signifies a position on the non-overwriting storage device where data can be written.

2. The method of claim 1 wherein the non-overwriting storage device comprises an array of non-overwriting storage devices.

3. The method of claim 1 wherein the provided file system is configured to maintain a separate write pointer for each pool of storage space, wherein the write pointer signifies a position on the non-overwriting storage device where data can be written.

4. The method of claim 1 wherein the provided file system is configured to automatically reclaim the multiple pools of storage space.

5. The method of claim 1 wherein the provided file system is configured to reclaim the multiple pools of storage space in response to a demand.

6. The method of claim 1 wherein the set of bands on the non-overwriting storage device are configurable.

7. The method of claim 1 wherein the provided file system is a modified version of any one of: Vulcan Object Store, LFS (BSD-LFS), ZFS, WAFL, Btrfs, UDF, Hammer, Fossil, NILFS, ULFS, CASL, SISL, JFFS/JFFS2, UBIFS, LogFS, YAFFS, or F2FS.

8. The method of claim 1 wherein the provided file system is configured to write data sequentially within each pool of storage space.

9. The method of claim 8 wherein the non-overwriting storage device is a shingled magnetic recording (SMR) device in a native configuration.

10. The method of claim 9 wherein an invalidated space within one of the multiple pools of storage space is not reclaimed until the entire pool of storage space is reclaimed.

11. The method of claim 8 wherein the non-overwriting storage device is an array of SMR devices each in a native configuration.

12. The method of claim 11 wherein an invalidated space within one of the multiple pools of storage space is not reclaimed until the entire pool of storage space is reclaimed.

13. An Information Handling System (IHS) comprising:
    a non-overwriting storage device;
    a module for determining a set of bands per non-overwriting storage device;
    multiple pools of storage space commensurate with the determined set of bands; and
    a file system configured to be non-WIP and manage the multiple pools of storage space, wherein the file system writes data to the multiple pools of storage space;
    wherein an invalidated space within one of the multiple pools of storage space cannot be reclaimed until the entire pool of storage space is reclaimed.

14. The IHS of claim 13 wherein the non-overwriting storage device comprises an array of non-overwriting storage devices.

15. The IHS of claim 13 wherein the file system is configured to maintain a separate write pointer for each pool of storage space, wherein the write pointer signifies a position on the non-overwriting storage device where data can be written.

16. The IHS of claim 13 wherein the file system is configured to automatically reclaim the multiple pools of storage space.

17. The IHS of claim 13 wherein the file system is configured to reclaim the multiple pools of storage space in response to a demand.

18. The IHS of claim 13 wherein the set of bands on the non-overwriting storage device are configurable.

19. The IHS of claim 13 wherein the file system is a modified version of any one of: Vulcan Object Store, LFS (BSD-LFS), ZFS, WAFL, Btrfs, UDF, Hammer, Fossil, NILFS, ULFS, CASL, SISL, JFFS/JFFS2, UBIFS, LogFS, YAFFS, or F2FS.

20. The IHS of claim 13 wherein the file system is configured to write data sequentially within each pool of storage space.

21. The IHS of claim 20 wherein the non-overwriting storage device is a SMR device in a native configuration.

22. The IHS of claim 21 wherein an invalidated space within one of the multiple pools of storage space is not reclaimed until the entire pool of storage space is reclaimed.

23. The IHS of claim 20 wherein the non-overwriting storage device is an array of SMR devices each in a native configuration.

24. The IHS of claim 23 wherein an invalidated space within one of the multiple pools of storage space is not reclaimed until the entire pool of storage space is reclaimed.

* * * * *